Aug. 2, 1960
R. T. ADAMS
2,947,178
GYROSCOPE
Filed March 5, 1957
3 Sheets-Sheet 1
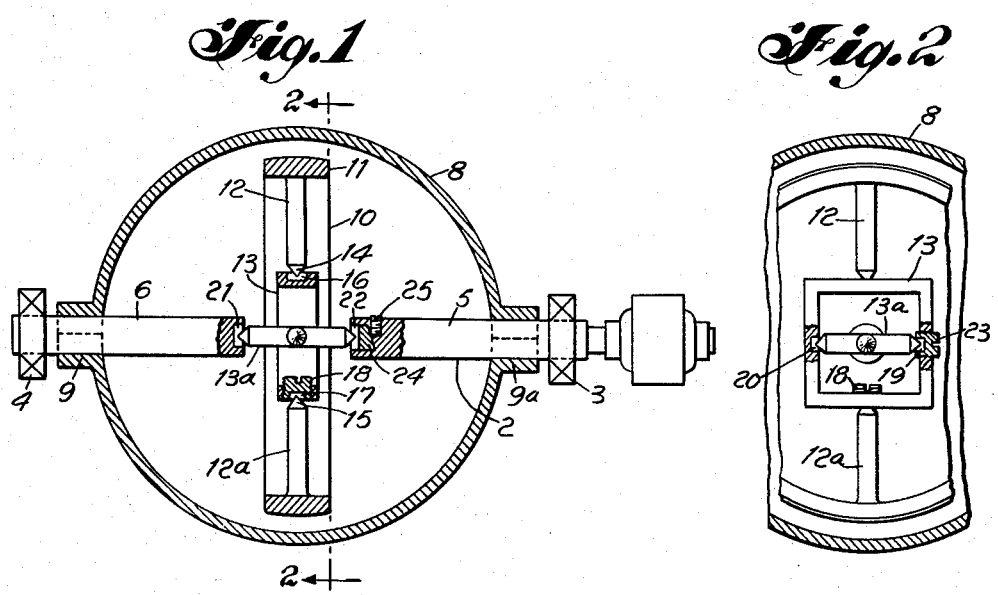
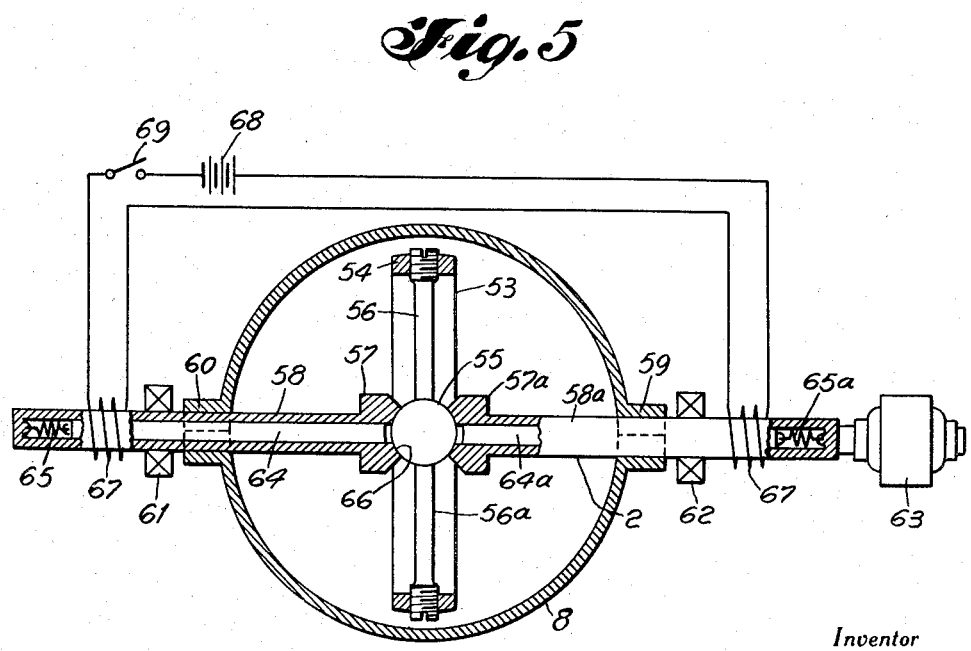
Inventor
ROBERT T. ADAMS
By Philip M. Bolton
Attorney

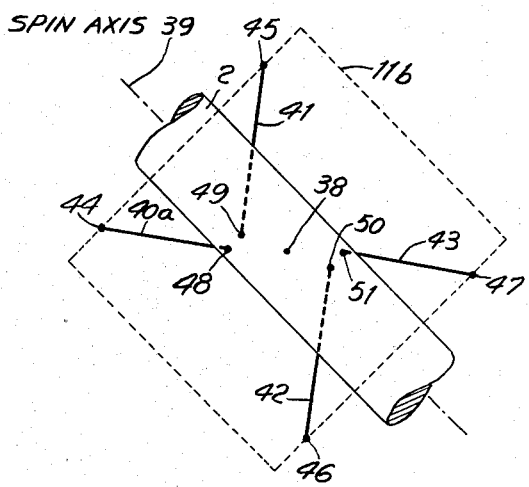
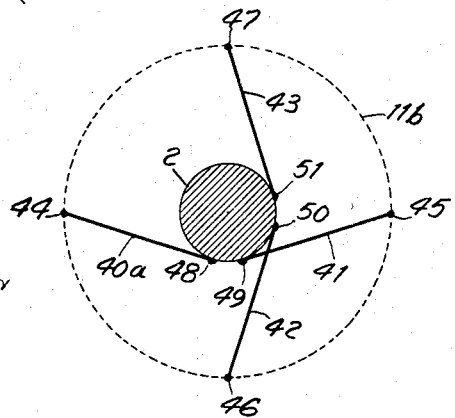
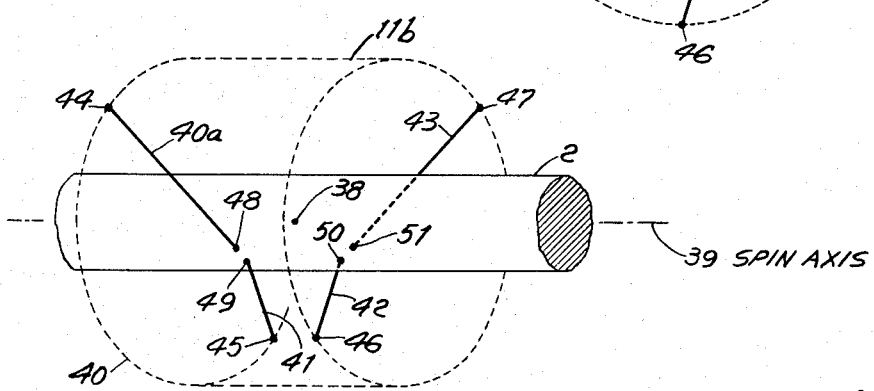

United States Patent Office 2,947,178
Patented Aug. 2, 1960

2,947,178
GYROSCOPE

Robert T. Adams, Short Hills, N.J., assignor to International Telephone and Telegraph Corporation, Nutley, N.J., a corporation of Maryland Filed Mar. 5, 1957, Ser. No. 644,031

2 Claims. (Cl. 74—5.7)

This invention relates to gyroscopes and more particularly to a gyroscope wherein all the degrees of rotation freedom are provided within the gyro-wheel.

The conventional gyroscope comprises a gyro-wheel or gyro-rotor spinning about its axis and supported by bearings so that its axis is free to rotate in one or more planes at right angles to the plane of spinning. The gyro-wheel is supported in a gimbal ring which in turn is supported in another gimbal ring; in this arrangement the gyro-wheel has three degrees of freedom of rotation. Gyroscopes have been devised which use a Hooke's or universal joint, instead of the gimbal rings to obtain two degrees of rotational freedom. It is arranged that the center of gravity of the rotor coincides with the center of suspension at the Hooke's joint coupling, thus forming a somewhat unconventional gyroscopic system having rotating gimbals. In gyroscopes there is present mass unbalance due to slop in bearings, friction, and uneven heating of parts which tends to shift the center of gravity of the rotor-wheel and thereby cause a torque to be exerted tending to rotate the shaft. This torque, even though slight, if manufacturing tolerances have been closely held, will cause precession of the gyro-rotor and thereby introduce error.

The Hooke's joint gyroscope presents the disadvantage that when it is operating at an angle, that is to say the axes of the joint and rotor do not coincide, forces are introduced which engender a fluctuating angular velocity component between the rotor and the drive shaft. Therefore at certain positions of the Hooke's joint an increase in tilt angle will force the rotor to advance with respect to the shaft, and a decrease in tilt angle will cause the rotor to retard with respect to the shaft. In other words, the angle between the rotor and the drive shaft is coupled through this defect in the Hooke's joint to angular velocity variation between the rotor and the shaft. Therefore, the torque on the drive shaft can cause precession of the gyro and thus introduce additional error.

Due to the mass unbalance inherent in conventional gyroscopes as above described, it is necessary to provide a long warm-up time to reach operating conditions. This is so when starting torque is first applied to the motor which starts to heat up. Approximately 20 to 30 minutes is required before thorough heat balance ensues and the gyro is capable of correct operation. It is apparent that where immediate use is required of the gyro, such a long waiting period cannot be tolerated. Some important areas of use for gyros where time is of the essence and warm-up time cannot be allowed are gyros used in airplanes and in inertial navigation for guided missiles. The usual practice to obviate such conditions is to keep the gyros in continuous operation so that they will be ready instantly when emergencies arise. However, continuous operation of the gyros especially during the time when not in actual use decreases the operational life and thereby multiplies the cost.

A further disadvantage of conventional gyroscope design is that they require excessive space and weight. These are important factors to be considered in the application of gyroscopes to inertial guidance for guided missiles and for airplane use where both weight and space is at a premium.

It is therefore an object of this invention to provide an improved gyroscope of the Hooke's joint type.

It is further an object of this invention to provide a gyroscope with at least two degrees of freedom of rotation.

It is another object of this invention to construct a gyro in which the rotor attitude with respect to the shaft is unconstrained, permitting the rotor to seek a position free from axial unbalance and thus eliminate errors due to linear acceleration.

It is still further an object of this invention to provide a gyroscope which requires a minimum of space and weight in its construction.

A feature of this invention is a gyroscope wherein a housing spins and the gyro-wheel or rotor is located within the housing and coupled thereto, and has at least two degrees of freedom of rotation.

Another feature of this invention is the use of a Hooke's joint, coupling the gyro-wheel to the spinning housing with three degrees of freedom of rotation of the gyro-wheel.

Still another feature of this invention is the use of a ball and socket joint coupling the gyro-wheel to the spinning member of the gyroscope.

A further feature of this invention is the use of wire suspension coupling the gyro-wheel to the spinning member of the gyroscope.

The above-mentioned and other features and objects of this invention will become more apparent by reference to the following description taken in conjunction with the accompanying drawings, in which:

Fig. 1 is a vertical section of one embodiment of this invention using the Hooke's joint;

Fig. 2 is a sectional view taken along line 2—2 of Fig. 1;

Fig. 4A is an end elevation view of another embodiment of this invention using a skew form of the wire suspension means;

Fig. 4B is an angle projection in plan of Fig. 4A;

Fig. 4C is a perspective view of the embodiment of Figs. 4A and 4B; and

Fig. 5 shows a gyroscope with a ball and socket joint coupling the gyro-wheel to the spinning member.

Figure 3B:
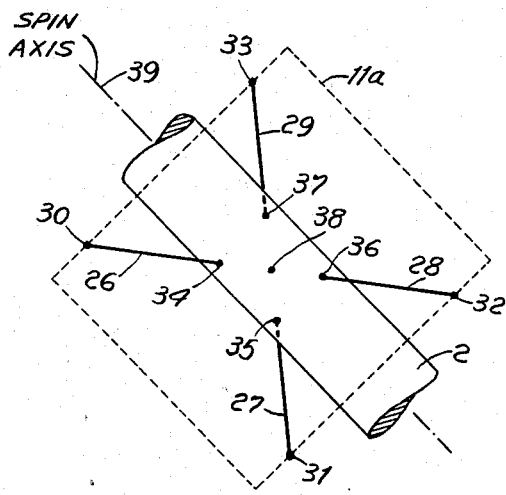
Fig. 3B is an angle projection in plan of Fig. 3A.

With reference to Figs. 1 and 2, there is shown a gyroscope 1 mounted for spinning by means of the spin shaft 2 supported by two bearings 3 and 4, which may be ball bearings or any other suitable type of bearings. The spin shaft 2 consists of two sections 5 and 6 the axes of which coincide, coupled to a Hooke's joint 7 at approximately the midpoint of the spin shaft 2. A housing 8 is rigidly secured to the spin shaft 2 at positions 9 and 9a, and rotates with the spin shaft 2. The housing 8 is shown as a sphere, which is the most favorable form as it occupies the least space, but it may be of any other shape or configuration. The gyro-wheel 10 consists of a rim 11 and two spokes 12 and 12a supporting the rim 11 and coupling the rim to the Hooke's joint 7. The Hooke's joint 7 comprises a member 13 within which, and pivotable about the axis thereof, is a cross 13a. The spokes 12 and 12a have pivot points 14 and 15 which are rotatable in jewel bearings 16 and 17 inserted in the member 13. Jewel bearing 17 is carried in adjustable screw 18, which is used for adjusting the coupling of spokes 12 and 12a to the Hooke's joint 7 for maximum freedom of rotation of the spokes with minimum friction. The ends of cross 13a also have pivot points supported in jewel bearings 19, 20, 21 and 22. Bearing 19 is carried in adjustable screw 23 and bearing 22 is supported in a holder 24 which is adjustably positioned by adjusting screw 25. It is to be understood that other forms of bearings may be used instead of the pivot pin and jewel bearings which are shown here by way of illustration only. For example, ball bearings may be used instead of the pivot pin and jewel bearings. It is obvious that the gyro-wheel 10 can rotate with the spin shaft 2 and also rotate independently of the spin shaft. Also the gyro-wheel 10 can rotate by means of the Hooke's joint configuration about two axes perpendicular to the spin axis of the gyroscope.

Regardless of the precision of manufacture, there will necessarily be some displacement of the center of gravity of the gyro-wheel 10 from the effective or kinematic center of the Hooke's joint 7. By deliberately increasing the radial unbalance and keeping the axial unbalance as small as possible the direction of this displacement can be made to fall within an angle $\theta$ from the radial, where $\theta$ is the angular freedom of the Hooke's joint. In operation the gyro-wheel will orient itself at an angle to the shaft, due to the influence of centrifugal forces such that the net mass unbalance is precisely radial with no axial component. In this condition, any component of acceleration or a gravitational pull in a radial direction will not produce a torque, because there is no axial unbalance. Any axial acceleration produces not steady torque because the direction of the radial unbalance is constantly reversing at the spin shaft rotation rate. Errors due to torque produced by axial unbalance are entirely eliminated providing, as is the case in this invention, the gyro-wheel is free to assume its own natural attitude with respect to the shaft.

Figure 3A:
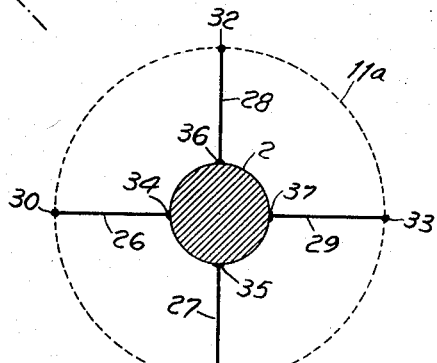
Fig. 3A is an end elevation view of an embodiment of this invention using one form of wire suspension means coupling the gyro-wheel to the spinning member.
Figure 3C:
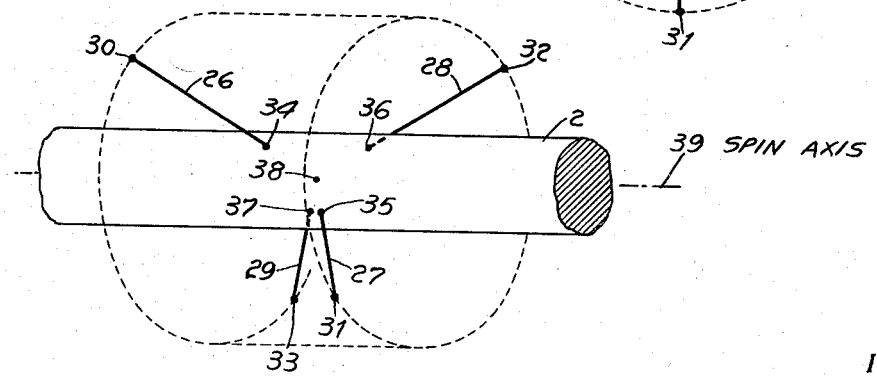
Fig. 3C is a perspective view of the embodiment of Figs. 3A and 3B.

Referring to Figs. 3A, 3B and 3C, the configuration of the gyroscope 1 is similar to Fig. 1 except for the coupling of the gyro-wheel rim 11a to the spin shaft. The rim 11a is coupled to the spin shaft 2, which is now a continuous shaft running from one end of the gyroscope to the other, by means of four wires 26, 27, 28 and 29 secured to the rim at points 30, 31, 32 and 33. Coupling points 33 and 30 lie in a first plane, and coupling points 31 and 32 lie in a second plane parallel to the first plane. The coupling points 30, 31, 32 and 33 are the apexes of a theoretical regular tetrahedron. The four wires are coupled to the spin shaft 2 at points 34, 35, 36 and 37, and if extended, the ends of the four wires would meet at a point 38 on the spin axis 39. Point 38 is the center of a theoretical regular tetrahedron and coincides with the center of gravity of the gyro-wheel 40. The tetrahedronal form of suspension requires the minimum number of filaments with equal elasticity in all directions.

Referring to Figs. 4A, 4B and 4C, there is shown another version of the wire suspension embodiment. Four wires 40a, 41, 42 and 43 are coupled to the gyro-wheel rim 11b at points 44, 45, 46 and 47. Coupling points 44 and 45 lie in a first plane and coupling points 46 and 47 lie in a second plane parallel to the first plane. The coupling points 44, 45, 46, and 47 are the apexes of a theoretical regular tetrahedron. The other ends of the four wires are coupled to the spin shaft 2 at points 48, 49, 50 and 51 so that the respective wires are tangent to the spin shaft at these points and at a minimum distance from point 38 on the spin axis 39 which is the center of the theoretical tetrahedron and coincides with the center of gravity of the gyro-wheel 40. The tangent points 48 and 49 are on the same side of the spin shaft 2 and of a line joining points 44 and 45. The tangent points 50 and 51 are on the same side of the spin shaft 2 and of a line joining coupling points 46 and 47. The form of wire suspension shown in Fig. 3 follows Hooke's law which states that within the elastic limit, deformation is proportional to stress, since due to the skewed wire arrangement, tension in any given wire varies linearly with torque, rather than increasing for both directions of torque. The skew form of each wire results in a torque between the spin shaft 2 and the rotor, but these torques are balanced by opposing skewed wires, so that the suspension does not unwind and go slack. The wire suspension restrains all three directions of linear movement and to some extent one degree of rotational freedom—in the direction of shaft rotation, but permits small angular freedom about the two axes perpendicular to the spin shaft 2. When the spin shaft 2 is rotating carrying with it the gyro-wheel 40, a tilt of the shaft axis 39 in any direction is not transmitted directly to the gyro-wheel which is free to continue rotating about its original axis. Due to the restoring force of the spring restraint in the wires, the spin axis of the gyro-wheel will precess or rotate slowly about the new (tilt) spin shaft axis, and at a constant angle to this axis; the rate of precession depending on the spring restraint stiffness of the wires and on the rotational mass of the gyro-wheel. The precession will continue until damped out by losses in the wire suspension or cancelled out by restoring not only the original spin shaft position but also the time integral of the shaft tilt to zero.

Referring to Fig. 5, a gyro-wheel 53 comprises a rim 54 coupled to a ball 55 at its center by means of spokes 56 and 56a. The center of gravity of the ball and socket joint which is composed of the ball 55 and the socket members 57 and 57a is the center of gravity of the gyro-wheel 53. The ball 55 is positioned centrally within the socket members 57 and 57a. The spin shaft 2, consisting of two sections 58 and 58a whose longitudinal axes coincide and is rigidly fastened to the housing 8 at positions 59 and 60. The spin shaft 2 is supported by the bearings 61 and 62, preferably of the ball-bearing type, and rotated by the motor 63. The spin shaft section 58 contains a magnetically permeable element 64 which is movable therein. The element 64 may be of a rectangular cross section slidably engaged within a similar cross section of spin shaft section 58 so that it cannot rotate independently of the spin shaft section 58, or if made of circular cross section, then it may be prevented from rotating independently of shaft 58 by pins or other suitable means apparent to one skilled in the art. One end of the element 64 is coupled to the spin shaft section 58 by means of spring 65. The other end of the element 64 is flush or under flush with surface 66 of the socket member 57 when no force is applied to the element 64 forcing it inwardly of the spin shaft 58 toward the center of the gyroscope. The spin shaft section 58a contains a similar element 64a and spring 65a operating in the same way as the element 64 and spring 65. Coils 67 and 67a are wound around the spin shaft 58 but do not rotate. The coils 67 and 67a are coupled to a source of electrical energy 68 and a switch 69. In the equilibrium position, either when not rotating or rotating at operational speed, the switch 69 is open. The coils 67 and 67a are de-energized and the elements 64 do not contact the ball 55. Assume that there are no means to couple the ball 55 to the socket members 57 and 57a. When the spin shaft 2 is initially rotated and before operating speed is attained, the gyro-wheel 53 will not rotate or may rotate at a much slower speed. Eventually if the gyro speed is increased, the friction between the ball 55 and the socket sections 57 and 57a will increase until there will be effective coupling therebetween and both the gyro-wheel 53 and the spin shaft 2 will rotate at the same speed. This, of course, may take some time. However, if braking means are available such as elements 64 and 64a pressing against the ball 55, then the coupling between ball 55 and the spin shaft 2 may be made at the start of the rotation and the gyro-wheel will be brought up to operational speed very quickly. When the coils 67 and 67a are energized by closing the switch 69, then the elements 64 are moved by magnetic force toward the ball 54 providing a physical coupling between the ball 55 and the spin shaft 2. After operational speed has been reached, the frictional forces between the ball 55 and the socket members 57 and 57a will be of sufficient magnitude to provide the coupling therebetween. The windings 67 and 67a can then be de-energized and the springs 65 and 65a will retract the elements 64 and 64a away from the ball 55.

The ball and socket joint has three degrees of rotational freedom and no degree of linear freedom. Therefore, the gyro-wheel is free to assume its own natural attitude with respect to the spin shaft. If any mass unbalance exists in the gyro-wheel, precession will result until a state of equilibrium is reached. The kinetic friction that exists between the ball 55 and socket members 57 and 57a will generate heat but because of the relatively large mass and large areas of contact between the ball and socket, the generated heat will be rapidly dissipated and should not affect the operation of the gyroscope.

While I have described above the principles of my invention in connection with specific apparatus, it is to be clearly understood that this description is made only by way of example and not as a limitation to the scope of my invention as set forth in the objects thereof and in the accompanying claims.

I claim:

1. A gyroscope comprising a housing, means for mounting said housing for rotation about a spin axis, a gyro-wheel, means for mounting said gyro-wheel for spinning within said housing and completely enveloped by said housing, said last-named means including a ball and socket joint between said housing and said gyro-wheel, the kinematic center of which coincides with said spin axis, said ball and socket joint supporting said gyro-wheel for rotation with at least two degrees of freedom of rotation, and clutching means securing the said ball to said socket to restrain rotation of said gyro-wheel about said spin axis with predetermined limits of rotation of said enclosure.

2. A gyroscope comprising a gyro-wheel, means for mounting said gyro-wheel for spinning about a spin axis, said means including a ball and socket joint, the kinematic center of which coincides with said spin axis, said ball and socket joint supporting said gyro-wheel for rotation with at least two degrees of freedom of rotation, clutching means securing said ball to said socket to restrain angular movement of said gyro-wheel about said spin axis within predetermined limits of rotation.

References Cited in the file of this patent

UNITED STATES PATENTS

| 2,474,072 | Stoner | June 21, 1949 |
| 2,729,106 | Mathiesen | Jan. 3, 1956 |
| 2,815,584 | Watson | Dec. 10, 1957 |

FOREIGN PATENTS

| 639,704 | Germany | Dec. 11, 1936 |